US005555110A

United States Patent [19]

Konuma et al.

[11] Patent Number: 5,555,110

[45] Date of Patent: Sep. 10, 1996

[54] METHOD OF DRIVING A FERROELECTRIC LIQUID CRYSTAL DISPLAY

[75] Inventors: Toshimitsu Konuma; Takeshi Nishi; Harumi Mori, all of Kanagawa, Japan

[73] Assignee: Semiconductor Energy Laboratory Company, Ltd., Kanagawa-ken, Japan

[21] Appl. No.: 167,357

[22] Filed: Dec. 15, 1993

[30] Foreign Application Priority Data

Dec. 21, 1992 [JP] Japan .................................... 4-357090
Dec. 28, 1992 [JP] Japan .................................... 4-360195

[51] Int. Cl.[6] ............................. G02F 1/133; G09G 3/36
[52] U.S. Cl. ................................................ 359/56; 345/97
[58] Field of Search ......................... 359/56, 100; 345/97

[56] References Cited

U.S. PATENT DOCUMENTS

| | | | |
|---|---|---|---|
| 4,367,924 | 1/1983 | Clark et al. | 350/334 |
| 4,643,842 | 2/1987 | Taguchi et al. | 359/103 |
| 4,973,135 | 11/1990 | Okada et al. | 350/334 |
| 4,986,638 | 1/1991 | Yamazaki et al. | 350/341 |
| 5,026,144 | 6/1991 | Taniguchi et al. | 350/350 S |
| 5,173,211 | 12/1992 | Yamashita et al. | 252/299.61 |
| 5,227,900 | 7/1993 | Inaba et al. | 359/56 |
| 5,323,172 | 6/1994 | Koden | 345/97 |

FOREIGN PATENT DOCUMENTS

| | | | |
|---|---|---|---|
| 60-262133 | 12/1985 | Japan | 359/56 |
| 61-09624 | 1/1986 | Japan | 359/56 |

*Primary Examiner*—William L. Sikes
*Assistant Examiner*—Charles Miller
*Attorney, Agent, or Firm*—Sixbey Friedman Leedom & Ferguson; Gerald J. Ferguson, Jr.; Evan R. Smith

[57] ABSTRACT

A liquid crystal electro-optical device comprising a ferroelectric liquid crystal material having spontaneous polarization. The liquid crystal material is sandwiched between substrates having TFTs thereon. When the liquid crystal material is driven with the TFTs, the TFTs apply a voltage in different polarities to switch the material between first and second states. This voltage for switching is required to be larger than the voltage that is necessary to maintain the present state of the liquid crystal material. To facilitate switching, the threshold value for inversion of the ferroelectric liquid crystal material preferably has a small value of 0.1 to 4 V. Preferably, the liquid crystal material shows uniform orientation or multi-microdomain orientation. There is also disclosed a liquid crystal electro-optical device comprising a liquid crystal material having spontaneous polarization. The liquid crystal material is sandwiched between transparent substrates having electrodes thereon. An orienting means is provided on one of the substrates surfaces which are in contact with the liquid crystal material to orient the liquid crystal material along one axis. When no voltage is applied from the electrodes to the liquid crystal material, the spontaneous polarization shows splay orientation between the substrates. When a voltage is applied, the spontaneous polarization shows uniform orientation.

5 Claims, 11 Drawing Sheets

METHOD OF DRIVING A FERROELECTRIC LIQUID CRYSTAL DISPLAY

FIELD OF THE INVENTION

The present invention relates to a liquid crystal electro-optical device which achieves a liquid crystal display with a wide gray scale. Also, the invention relates to a liquid crystal electro-optical device used in a high-speed liquid crystal display which produces numerous gray levels and has a liquid crystal material possessing spontaneous polarization. This liquid crystal material is sandwiched between substrates which transmit light and are provided with electrodes. During the operation of this liquid crystal display, a voltage is constantly applied to the liquid crystal material without utilizing its ability to retain its current state. This display is driven by ferroelectric liquid crystal light shutters or thin-film transistors.

BACKGROUND OF THE INVENTION

Application of electronic devices using liquid crystals has not been limited to watches, clocks, thermometers, and other similar devices. Such electronic devices have found wider applications including word processors, laptop computers, and even TV receivers.

N. A. Clark and S. T. Largerwall have made the merits of ferroelectric liquid crystals, in which the liquid crystals themselves have spontaneous polarization, widely known in the industry. Antiferroelectric liquid crystals which are opposite in nature to the above-described ferroelectric liquid crystals have been made widely known in the industry by Chandani and others. These liquid crystals are different in characteristic from generally accepted nematic liquid crystals such as twisted nematic (TN) liquid crystal displays and supertwisted nematic (STN) liquid crystals.

In the exemplary view of FIG. 1, liquid crystal molecules 102 of ferroelectric liquid crystal are oriented in a given direction according to the orientation control of the surface 100 of a substrate. A layered structure 101 is formed between adjacent liquid crystal molecules. Such layered structures are arrayed in a highly organized fashion in three dimensions. Where the cell is thin, the direction of the long axis of each liquid crystal molecule takes two states, i.e., a first state 102 and a second state 103.

A ferroelectric liquid crystal has spontaneous polarization Ps ($C/m^2$) as indicated by the arrows in FIG. 1. When a voltage is applied to the liquid crystal cell, an electric field is produced perpendicular to the surfaces of the substrates. The spontaneous polarization is directed antiparallel to the direction of the electric field by a torque Ps.E which is the product of the strength of the electric field E (V/m) and the spontaneous polarization Ps. In step with the movement of the spontaneous polarization, the long axis of each liquid crystal molecule is switched between the first state 102 and the second state 103. That is, the state assumed by the long axis can be controlled by the direction of the applied electric field.

Ferroelectric liquid crystal has various features. In particular, the long axis can be quickly switched between the two states, as shown in FIG. 1, by making use of spontaneous polarization. After the application of the electric field, the state can be maintained stably. When observed with polarizer plates, the two states can be distinguished over a wide range of viewing angles. Therefore, it is much expected that ferroelectric liquid crystals will act as liquid crystal materials capable of realizing high-speed viewing screens with high information content.

Usually, a ferroelectric liquid crystal is driven by a simple matrix addressing structure comprising a number of strip-shaped electrodes disposed on a pair of substrates, the liquid crystal being sandwiched between the substrates. When an electric field is applied thereto, this state is stably maintained. That is, information is retained. This feature, which nematic liquid crystals cannot exhibit, is utilized.

This feature is utilized in displays with very high information content, e.g., having 1000×1000 pixels or more. These displays are usually driven by a so-called two-field method or four-pulse method. In these drive methods, a small but continuous alternating voltage is applied. Therefore, the waveform induces fluctuations in the optical response of the liquid crystal, thus considerably deteriorating the contrast ratio thereof.

In practice, when a ferroelectric liquid crystal is sandwiched between a pair of substrates and observed with a microscope, the spontaneous polarization is seen to be directed toward either substrate, i.e., uniform orientation, as shown in FIG. 1. In addition, splay orientation is observed, i.e. the spontaneous polarizations of some molecules are directed inward and the spontaneous polarizations of other molecules are directed outward on the surfaces of the substrates. Under this condition, the direction of the long axis of each liquid crystal molecule is bent between the substrates, i.e., in a twisted state. The twisted molecules cannot assume a quenching position. Consequently, contrast is low, the current state cannot be retained, and this orientation state is not practical.

This orientation is in a twisted state when viewed from the long axis of each molecule and in a splay state when viewed from spontaneous polarization. With respect to ferroelectric liquid crystals, both of these mean the same orientation.

Where an image should be displayed with high contrast, a uniform orientation must be always used. Also, each molecule must retain its current state. However, it is difficult to satisfy these two requirements over a wide range of temperatures. As a result, the above-described splay orientation appears.

Presently, it is necessary to drive a ferroelectric liquid crystal capable of maintaining its current state as described above by a separate method and to display images stably without relying only on the simple matrix address driving method. In order to stably drive a liquid crystal material having spontaneous polarization, both a bright state and a dark state should be produced by direct drive, i.e., a voltage is continuously applied to the liquid crystal when an image is being displayed. At this time, the ability to retain the current state is not utilized. The spontaneous polarization and optical response can be completely controlled by the direction of an externally applied electric field.

Taking these facts into account, only one pixel can be used as a simple shutter, although display cannot be performed in a simple matrix panel. This can be employed as a shutter or the like for controlling ON and OFF states for a large amount of light in a projection display. This driving method can include a method of driving a display comprising substrates having pixels incorporating thin-film transistors (TFTs). In any case, the features which cannot be realized by nematic liquid crystals, i.e., fast response and high contrast, can be fully exploited. However, when an image is displayed by a ferroelectric liquid crystal driven by this method, if a liquid crystal material which would conventionally be used to make a simple matrix structure is directly used, then satisfactory results are not obtained.

In particular, a liquid crystal driven by a simple matrix addressing method retains the present state and usually has a small pretilt angle of about 0° to 15°, the angle being made between the substrates and the layered structures of the ferroelectric liquid crystal. The angle made between the first and second states assumed by the liquid crystal is often small. This angle, known as the cone angle, is approximately 10to 38°.

In order to have a high contrast ratio, the light transmittance must be high in the bright state and low in the dark state. To increase transmittance to its maximum in the bright state, it is necessary for the cone angle to be 45°.

Accordingly, the cone angles of the materials for simple matrix structures are too small for directly driven panels which should have high transmittance values. In consequence, materials for use in direct drive must be devised.

In practice, however, some liquid crystals show not only uniform orientation in which spontaneous polarization is directed toward either substrate, but also twisted orientation (i.e., spontaneous polarization is directed inward on the surfaces of both substrates and the long axis of each liquid crystal molecule is bent between the substrates when no electric field is applied). Such a liquid crystal exhibiting the above-described twisted orientation cannot take a quenching position and therefore its contrast is low. If the torque Ps.E is activated by the application of an electric field, every spontaneous polarization is uniformly oriented toward either substrate surface, as shown in FIG. 1.

Referring next to FIG. 2, with respect to antiferroelectric liquid crystals, the direction of the long axis of each liquid crystal molecule assumes a first state 120 and a second state 121 in the same way as the aforementioned ferroelectric liquid crystals. In addition, the direction of the long axis of each antiferroelectric liquid crystal molecule can take a third state 122. When no voltage is applied, the third state is assumed. When a negative voltage is applied, the first state is assumed and when a positive voltage is applied, the second state is assumed.

A clear threshold voltage exists between the third and first states and the third and second states. The presence of these threshold values makes the characteristics of the antiferroelectric liquid crystal differ greatly from those characteristics when the ferroelectric liquid crystal is being driven.

A simple matrix display which drives a liquid crystal by electrodes by making positive use of the features of a ferroelectric or antiferroelectric liquid crystal has been developed. The liquid crystal which is sandwiched between the electrodes is driven by these electrodes machined into strips.

However, it is difficult to develop a high-performance display which activates a liquid crystal material having spontaneous polarization by simple matrix addressing. For this and other reasons, development of a high-performance panel which can display images stably and in which TFTs or metal-insulator-metal (MIM) film nonlinear devices are disposed has been discussed.

Numerous problems which were considered to be difficult to solve have been successfully solved by the use of switching devices described above. In either ferroelectric and antiferroelectric liquid crystals, the assumed one of two or three states is determined only by the direction of the applied electric field. Therefore, it is difficult to vary the gray level by the applied voltage, unlike twisted nematic liquid crystals. Hence, it has been considered that a wide gray scale cannot be readily obtained from ferroelectric and antiferroelectric liquid crystals. As a result, these liquid crystals have not been used in displays required to provide a wide gray scale such as TV displays although they show high-speed switching characteristics and wide viewing angles. Accordingly, there is an urgent need for techniques for realizing displays using ferroelectric and antiferroelectric liquid crystals and having a wide gray scale.

Three approaches are available to meet this requirement. One is to divide each pixel into n parts, and $2^n$ gray levels are produced by each pixel. In this method, however, the number of pixels is substantially increased by a factor of n. Consequently, the production yield decreases, and the cost is increased.

A second method is to use an analog gray scale which employs TFTs. In particular, a ferroelectric liquid crystal can take both a first state and a second state. The peak value of the voltage applied to the ferroelectric liquid crystal is varied to adjust the ratio of the area of the portions in the first state to the area of the portions in the second state. When a ferroelectric liquid crystal is driven by simple matrix addressing, the electric charge going into and out of the capacitor of each pixel varies constantly and so this second method is impossible to carry out.

However, where TFTs are used, if a gate is turned off after injection of an electric charge, the amount of electric charge going into and out of each pixel electrode via TFTs is zero. Therefore, the liquid crystal can be maintained in a given state. In consequence, a gray scale can be accomplished by varying the area of portions of the liquid crystal in a first state and the area of portions in a second state.

A third method relies on digital gray scale also using TFTs. This makes use of the fact that a ferroelectric liquid crystal assumes only two states, white and black, and responds at a high speed. Various gray levels are obtained by changing the times for which the liquid crystal respectively assumes white and black states. For example, it is assumed that a white state is displayed for 0.2 msec and that a black state is displayed for 0.8 msec. If this process is repeated, then a transmittance of 20% is obtained provided that the observer sees 100% transmittance and 0% transmittance respectively as complete white and black. If the operating frequency is in excess of 60 Hz, then the observer sees no flickering effect. Since a ferroelectric liquid crystal inherently has a high switching speed, if a digital gray scale is used, a display with a wide gray scale can be accomplished.

A digital gray scale is not attained unless a feature of the ferroelectric liquid crystal, i.e. that the response speed is three or four orders of magnitude as high as the response speeds of TN and STN liquid crystals, is fully utilized. Hence, this method makes full use of the high speed of the ferroelectric liquid crystal but requires switching devices such as TFTs or the like.

Where a liquid crystal material having spontaneous polarization is driven by TFTs, a problem not encountered in a nematic liquid crystal driven by TFTs takes place. Obviously, this problem is caused by the fact that switching modes differ according to the liquid crystal material.

The magnitude of spontaneous polarization in liquid crystals normally used lies within the range of 1 to 100 nC/cm$^2$. Antiferroelectric liquid crystals having spontaneous polarizations of several hundreds of nC/cm$^2$ are rarely used. This amount of electric charge is that supplied when the liquid crystal is inverted. Inversion does not occur unless at least this amount of electric charge is supplied from the outside. This amount of charge is much larger than the amount of electric charge necessary when driving a nematic liquid crystal. Accordingly, when driving a nematic liquid crystal, it is preferable to use a liquid crystal with a large voltage retention rate. However, this principle cannot be applied to a ferroelectric liquid crystal which is driven by TFTs.

Measurement of voltage-retaining factor as a method for evaluating nematic liquid crystals is described now by referring to FIG. 3. A liquid crystal pixel 134 is connected with a TFT comprising a source 130, a drain 131, and a gate 132. A data signal is supplied to the source 130 through a supply terminal 138. The data signal is routed to the drain 131 in response to a voltage applied to the gate. The signal is then supplied to the pixel electrode. When the gate is off, the resistance between the source and the drain is high and therefore the electric charge supplied to the pixel does not flow in or out via the TFT.

The waveform of this signal is illustrated in FIG. 4. The data signal taking the form of a rectangular wave 143, for example, is applied between the source and drain. A voltage 144 is applied to the drain only when the gate electrode 140 is on. Thus, an ideal voltage 141 stored in a pixel electrode is maintained as a constant voltage without attenuation. On the other hand, a voltage 142 stored in an ordinary liquid crystal pixel is attenuated with time. The effective value of an ideal voltage and the effective value of a voltage in an evaluated liquid crystal is measured. The ratio of the former value to the latter value is referred to as the voltage-retaining factor. Of course, as the voltage-retaining factor approaches 100%, more desirable characteristics are obtained.

Where the voltage-retaining factor is small, the voltage developed across the pixel capacitor varies with time. Since the transmittance of a nematic liquid crystal varies with the applied voltage, if the voltage-retaining factor is small, then the amount of light transmitted through the pixel varies with time. This makes it impossible to have a gray scale with high reproducibility.

The condition obtained when a liquid crystal material having spontaneous polarization is driven by TFTs is described below. The measuring system shown in FIG. 3 is used. The liquid crystal cell 134 may be a ferroelectric liquid crystal having spontaneous polarization or an antiferroelectric liquid crystal. Examples of measurement are illustrated in FIG. 5. Variations in the optical response of the liquid crystal were measured together with the potential at the pixel electrode. As can be seen in FIG. 3, a voltmeter 137 is provided for measuring the potential at the pixel electrode.

When the gate is ON, an electric charge is injected into the pixel electrode. In FIG. 5(1), a constant voltage $V_0$ 152 is supplied. Thereafter, the pixel potential is attenuated and assumes a constant state. At this time, the optical change 155 in the liquid crystal changes from a bright state to a dark state or vice versa. Since this optical change agrees with the decrease in the pixel electrode potential, it follows that inversion of the state of the ferroelectric liquid crystal has consumed the pixel charge. In particular, a charge equal to twice the product of the spontaneous polarization and the electrode area is consumed. As a result, the potential remaining in the pixel is $V_{rem}$ 153. Thereafter, the pixel voltage and the optical response remain constant. The ferroelectric liquid crystal sufficiently responds with TFTs.

Under this condition, the voltage is changed to ½ $V_0$ 156, for example. This state is shown in FIG. 5(2). $V_{rem}$ 157 drops further, and optical response 158 of the liquid crystal is not sufficient. An intermediate optical position is still assumed.

This phenomenon occurs when the pixel select time is short, as well as when the voltage is reduced. That is, the amount of electric charge injected into the pixel is not sufficient to invert the liquid crystal. Since a ferroelectric liquid crystal is driven by TFTs, using the above-described phenomenon, it is necessary to establish a new method of evaluating a ferroelectric liquid crystal, the method being different from the conventional method of evaluating a voltage-retaining factor. For this purpose, two facts differing essentially from nematic liquid crystals must be understood: (1) when a ferroelectric liquid crystal is switched to a different state, the spontaneous polarization is inverted, thus resulting in a decrease in the liquid crystal potential; and (2) no clear threshold values exist in the inversion.

SUMMARY OF THE INVENTION

It is an object of the present invention to provide a fast-response liquid crystal electro-optical device with a wide gray scale.

Where a liquid crystal material having spontaneous polarization is directly driven by an externally applied electric field, a high contrast ratio and fast response are required. In order to obtain a high contrast ratio, it is necessary that the transmittance assume its maximum and minimum values in its respective bright and dark states.

As shown in FIG. 16, the present invention provides a device comprising a pair of transparent substrates 290 and 292 having electrodes. A liquid crystal material 294 having spontaneous polarization is sandwiched between the substrates. The device is further equipped with a means 291 for orienting the molecules of the liquid crystal material in one direction only on the surface of one substrate 290 in contact with the liquid crystal material. When the electrodes apply no voltage to the liquid crystal material, some of the spontaneous polarizations of the molecules are oriented toward the gap between the substrates, while the others are oriented away from the gap. This is referred to as splay orientation. When a voltage is applied to the liquid crystal material from the electrodes, all the spontaneous polarizations are uniformly oriented. This is referred to as uniform orientation.

In one feature of the invention, a voltage exceeding the voltage required to maintain the uniform orientation of the liquid crystal material is applied to produce uniform orientation.

In another feature of the invention, the angle between first and second states assumed by the liquid crystal molecules oriented uniformly is 40° to 50°.

In a further feature of the invention, the direction in which the electro-optical characteristics of the above-described device are stable is made coincident with the polarization axis of a polarizer plate 297.

The present invention uses a device comprising a pair of transparent substrates having electrodes, a liquid crystal material having spontaneous polarization sandwiched between the substrates, and a means for orienting the molecules of the liquid crystal material in one direction only on the surface of one substrate in contact with the liquid crystal material. A dark state is not observed with a polarization microscope. Some spontaneous polarizations are oriented toward the gap between the substrates, whereas others are oriented away from the gap. That is, the spontaneous polarizations show splay orientation 298.

A voltage is applied to the cell, and optical characteristics are measured. The resulting property is a monostable characteristic. That is, when liquid crystal molecules are located in one of two positions, they are stable electro-optically. If the long axes of the oriented molecules are aligned with the polarization axis in this stable position, then low transmittance is obtained in the dark state.

Then, a voltage is applied to the liquid crystal material. The spontaneous polarizations are oriented uniformly as indicated by 299. As a result, a good dark state 200 is obtained.

In order to produce the aforementioned uniform orientation, it is necessary to apply a voltage exceeding the voltage required to maintain uniform orientation without inducing splay orientation of the liquid crystal. Investigation of various systems has revealed that a voltage of 3 to 7 V or more is needed.

Since a uniform orientation is readily obtained by applying a voltage in this way, we consider that the molecules assume a weak splay orientation in practice. This can be understood from the electro-optical characteristics when orientation means are provided on both surfaces.

The material producing a uniform orientation during application of a voltage has a cone angle which is large over a wide range of temperatures. The angle made between first and second states assumed by liquid crystal molecules can easily assume angles of 40°–50°. This makes it easy to directly drive the liquid crystal material having spontaneous polarization by continuously applying a voltage. This method can be satisfactorily used to drive simple shutters and TFTs.

We have noted the mechanism for producing spontaneous polarization of a ferroelectric liquid crystal when it is driven by TFTs, and carefully examined the optical response of the liquid crystal to the waveform of the driving signal and the residual voltage in the liquid crystal. As a result, we have found that the voltage necessary to switch the ferroelectric liquid crystal to another state is quite important.

It has usually been considered that a ferroelectric liquid crystal is switched between different states in response to a change in the electric field and that the applied voltage has no threshold value. However, we have found that when a ferroelectric liquid crystal is actually driven by TFTs, a certain threshold voltage is necessary to stably produce the first state or the second state shown in FIG. 1, although this threshold voltage for changing the state is small. In this way, the threshold voltage becomes a quite important factor. The threshold voltage $V_{th}$ referred to herein is a voltage necessary to change a liquid crystal from a first state to a second state. In practice, this threshold value is not zero but is a certain finite value.

More specifically, where a liquid crystal is switched from a first state to a second state, if a given voltage is applied, a state-maintaining voltage $V_{SM}$ which remains in the pixel electrode after inversion of spontaneous polarization or movement of another charge must be taken into account. This voltage $V_{SM}$ maintains spontaneous polarizations assuming the second state is uniformly oriented as shown in FIG. 1.

This voltage is different from a strictly defined threshold voltage such as Frederics transitions in nematic liquid crystals. Intrinsically, this voltage is induced by deviation of the electrical characteristics of the liquid crystal cell caused by the characteristics of the material and the method of treating the orientation, or by interaction between the spontaneous polarization and the orientation film.

First, a method of evaluating the threshold value of a ferroelectric liquid crystal cell is described. The cell comprises a liquid crystal material having spontaneous polarization and sandwiched between a pair of transparent substrates. Lead electrodes and pixel electrodes are disposed on these substrates. A means is provided on the substrate surface in contact with the liquid crystal material to orient the liquid crystal material in one direction in at least the initial stage. A slow rectangular wave was applied between 20 and 0.1 V. Optical changes when the optical response was sufficient in every direction of electric field were examined. When the applied voltage decreased, the optical response of the liquid crystal material slowed down greatly. Sometimes, the response surpassed 1 second and reached several seconds. Where the voltage was in excess of 5 V, the transmittance of the cell sufficiently responded, i.e. changed from a first state to a second state. Where the voltage was less than 5 V, the cell responded within a narrower range of transmittance. As the applied voltage decreased, the range of the response of the cell decreased.

This voltage of 5 V is the threshold voltage necessary to invert the liquid crystal. At the same time, the voltage is the state-maintaining voltage $V_{SM}$ required to maintain the present state. A voltage $V_{rem}$ is finally remaining in the pixel when the aforementioned ferroelectric liquid crystal is driven by TFTs. Comparison of the magnitude of this parameter $V_{rem}$ with the state-maintaining voltage $V_{SM}$ is quite important for switching the ferroelectric liquid crystal.

Whether the ferroelectric liquid crystal is made to fully respond by the TFTs or not depends on whether the magnitude of the pixel potential $V_{rem}$ after inversion of the liquid crystal is sufficiently in excess of the state-maintaining voltage $V_{SM}$ of the liquid crystal.

It is not necessary to distinguish between the threshold voltage and the state-maintaining voltage. A voltage much greater than this voltage is applied at the initial stage where the liquid crystal is driven by TFTs. This large voltage is not important for switching. Rather, the magnitude of the voltage finally remaining in the pixel is important. Therefore, when a liquid crystal having spontaneous polarization is driven with TFTs, it is more appropriate to refer to the voltage as the state-maintaining voltage rather than as the threshold voltage.

Accordingly, the inventors of the present invention again concentrated on the state-maintaining voltage of a ferroelectric liquid crystal, measured the threshold voltages of various liquid crystal cells of ferroelectric liquid crystals, and found that optimum conditions exist in driving a liquid crystal material having spontaneous polarization with TFTs.

A liquid crystal electro-optical device according to the present invention comprises: a pair of transparent substrates having a lead electrode and a pixel electrode thereon; a liquid crystal material having spontaneous polarization and sandwiched between the substrates; orienting means formed on surfaces of the substrates which are in contact with the liquid crystal material, the orienting means acting to orient molecules of the liquid crystal material along one axis at least in an initial stage; and a thin-film transistor connected with the pixel electrode at one of source and drain thereof and acting to apply a voltage in different polarities to the liquid crystal material, for switching the liquid crystal material between a first state and a second state. A voltage exceeding a voltage required to maintain the liquid crystal material in one of the first and second states is applied to the pixel electrode during each select period in which the electro-optical device is displaying an image.

The application of said voltage exceeding the voltage required to maintain the liquid crystal material in one of said first and second states is carried out by applying a voltage pulse to a gate of the thin-film transistor at a pulse width of 0.1 μsec. to $1.5T_0$ with a frame period between 1/6000 sec. and 1/66000 sec., and applying a voltage of 10 V to 25 V to the other one of said source and drain during the application of said voltage pulse where $T_0$ is a response time of said liquid crystal material. In order to output a voltage of 10 V to 25 V to said pixel electrode in this case, a polysilicon thin-film transistor is suitable.

The invention also provides a liquid crystal electro-optical device comprising: a pair of transparent substrates having lead electrodes and pixel electrodes thereon; an electro-optical modulating layer provided between said substrates and comprising a liquid crystal material having spontaneous polarization; orienting means formed on surfaces of the substrates which are in contact with the liquid crystal material, the orienting means acting to orient molecules of the liquid crystal material along one axis in at least an initial stage; and thin-film transistors connected with the pixel electrodes respectively and acting to apply a voltage in different polarities to the liquid crystal material, for switching the liquid crystal material between a first state and a second state. A first voltage exceeding a second voltage required to maintain the liquid crystal material in one of the first and second states is applied to the liquid crystal material. The second voltage has a small value between 0.1 and 4 V. Considering the thickness of the electro-optical modulating layer, ratio (the second voltage)/(the thickness of the electro-optical modulating layer) is between 0.03 and 3MV/m.

Furthermore, the invention provides a liquid crystal electro-optical device comprising: a pair of transparent substrates having lead electrodes and pixel electrodes thereon; a liquid crystal material having spontaneous polarization and sandwiched between the substrates; orienting means formed on surfaces of the substrates which are in contact with the liquid crystal material, the orienting means acting to orient molecules of the liquid crystal material along one axis in at least an initial stage; and thin-film transistors connected with the pixel electrodes, respectively. When no voltage is applied, the spontaneous polarization of each molecule between the substrates is oriented toward either one of the substrates.

In one feature of the invention, the used liquid crystal material exhibits multi-microdomain orientation.

The use of the present invention described above is quite effective in driving a liquid crystal material having spontaneous polarization with TFTs. When a ferroelectric liquid crystal is injected into the cell having TFTs thereon and is activated, the pixel electrode voltage decreases in response to inversion of the spontaneous polarization. If the voltage decreases excessively, then it is impossible to display the ferroelectric liquid crystal in any one of the two states.

In the present invention, however, a positive or negative voltage is applied to the liquid crystal material via the TFTs. The direction of the electric field produced in the pixel electrodes determines the state (i.e., the first state or the second state) assumed by the liquid crystal material. The potential in the pixel electrodes is in excess of the voltage $V_{SM}$ which maintains the first or second state during each select period. This assures that the molecules of the liquid crystal material are stabilized in one of the states. In order to activate a liquid crystal material having spontaneous polarization, these requirements must be satisfied.

For example, when no voltage is applied, the spontaneous polarization of the liquid crystal material is directed either inward or outward between the substrates. Where the direction of the long axis of each molecule is twisted, i.e. twisted orientation, this invention is necessitated.

The state-maintaining voltage $V_{SM}$ for liquid crystals exhibiting twisted orientation has a large value exceeding 5 V. Where the invention is utilized, the twisted state is modified into the first or second state. Under this condition, the ferroelectric liquid crystal material can be sufficiently driven with TFTs.

Also, where an antiferroelectric liquid crystal having a threshold value in itself is driven with TFTs, the present invention is required. The voltage corresponding to spontaneous polarization is consumed and the pixel electrode voltage drops. If a pixel electrode voltage after this drop exceeds the threshold value of the antiferroelectric liquid crystal material which directly indicates the state-maintaining voltage $V_{SM}$, either the first or second state can be stably obtained without changing to the third state.

The inventors have considered that if the voltage required to maintain any state of a liquid crystal is large, then a liquid crystal material having spontaneous polarization cannot be readily driven with TFTs. Accordingly, we have discovered liquid crystal materials having state-maintaining voltages $V_{SM}$ of 0.1 to 4 V, these materials being made by development of materials and improvements in orientation techniques. Where the state-maintaining voltages $V_{SM}$ are very small, these liquid crystal materials having spontaneous polarization can be driven easily with TFTs.

This type of liquid crystal materials is oriented toward one of the substrates between which the material is sandwiched. This is uniform orientation as illustrated in FIG. 1. In this case, interaction between the spontaneous polarization and the orientation film does not take place. The state selected by the direction of electric field is stably maintained after the application of the field. Of course, the state-maintaining voltage $V_{SM}$ is low, less than 1 V. Therefore, where a liquid crystal is driven with TFTs and the residual voltage is low, stable image display can be provided. If the liquid crystal potential $V_{rem}$ after inversion of the liquid crystal is 1.5 V, for example, the liquid crystal can respond sufficiently optically, and the ferroelectric liquid crystal can be driven with TFTs.

The orientation of the liquid crystal can also be multi-microdomain orientation in which the long axes of numerous clusters 170 are oriented in the rubbing direction, as shown in FIG. 6. The threshold value of this liquid crystal is approximately 0.8, and it can be sufficiently driven with TFTs. If the liquid crystal potential $V_{rem}$ after inversion of the liquid crystal is 1.3 V, for example, the liquid crystal can respond sufficiently optically, and the ferroelectric liquid crystal can be driven with TFTs.

Other objects and features of the invention will appear in the course of the description thereof, which follows.

BRIEF DESCRIPTION OF THE DRAWINGS

FIG. 1 3 is a graph showing comparative examples of measured threshold voltages of ferroelectric liquid crystals;

DETAILED DESCRIPTION OF THE INVENTION

EXAMPLE 1

Figure 16:
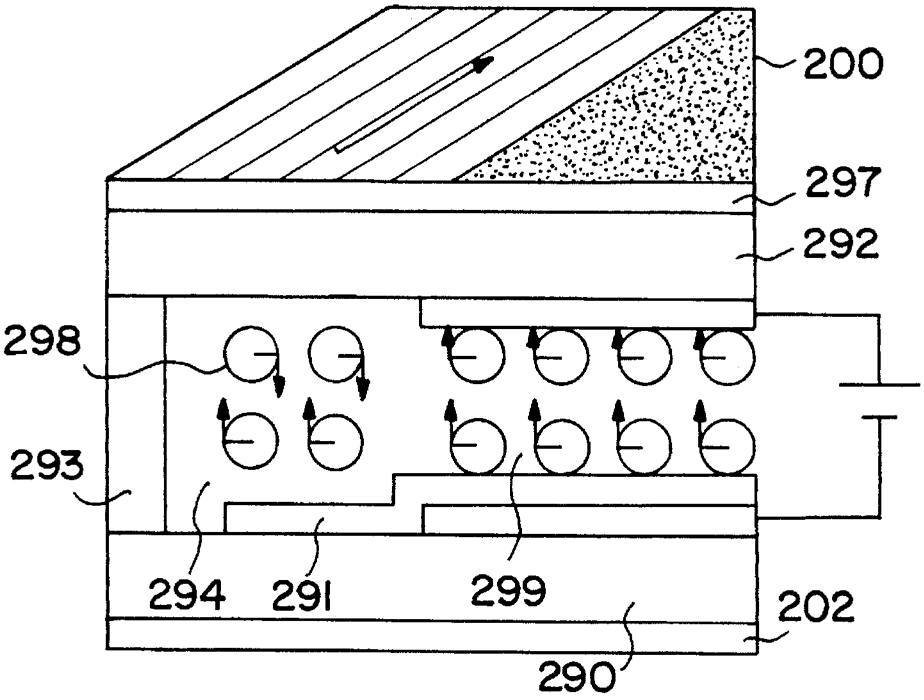
FIG. 16 is a cross-sectional view of the structure of a liquid crystal cell according to the present invention.

A ferroelectric liquid crystal cell having an orientation means on only one substrate is described. Results of evaluation of the state-maintaining voltage characteristics of the liquid crystal having spontaneous polarization are described by referring to FIG. 16. Indium tin oxide (ITO) was sputtered or deposited as a film having a thickness of 500 to 2000 Å on a soda-lime glass 290. This film was patterned by conventional photolithography. Two sheets of such substrates 290 and 292 were prepared. Polyimide 291 was applied to one substrate 290 by spin coating and baked at 280° C. LQ5200 manufactured by Hitachi Chemical Co., Ltd., Japan, or LP-64 manufactured by Toray Industries, Japan, was used as the polyimide. The thickness of the polyimide film was 100 to 300 Å. This substrate was rubbed in one direction. This was placed opposite the non-oriented glass substrate 292. Shinshikyu made of silica in the form of particles having diameters of 1.5 μm manufactured by Catalytic Chemical Co, Ltd., Japan, was dispersed as a spacer (not shown) on the substrate on the side of the orientation film. A sealing layer 293 made from epoxy resin was formed by screen printing on the side of the counter electrode. Both substrates were bonded together while maintaining the spacing between them at about 1.5 μm according to the diameters of the spacer particles. A ferroelectric liquid crystal 294 of phenyl pyrimidine was injected into the cell. The phase sequence was isotropic phase—smectic A phase—smectic C* phase—crystalline phase. The magnitude of spontaneous polarization was 6 $nC/cm^2$. The dielectric constant was 4.4. The response speed obtained when a voltage of 14 V was applied to the cell was 100 μsec. The temperature at which a transition to the isotropic phase was made was about 90° C. The liquid crystal material was heated to 110° C., and was injected under a vacuum when it became isotropic.

The orientation was observed with a polarization microscope without applying a voltage. Orientation at electrode portions and positions other than electrodes did not produce dark state positions even if the cell was rotated, but showed splay orientation.

Figure 13:
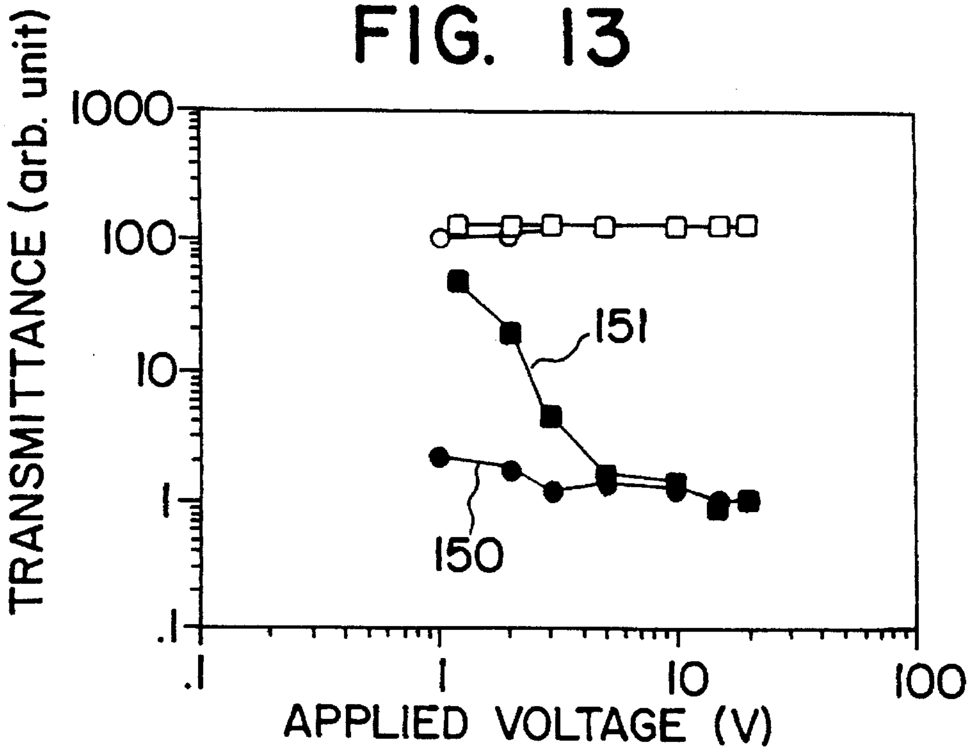
Figure 18:
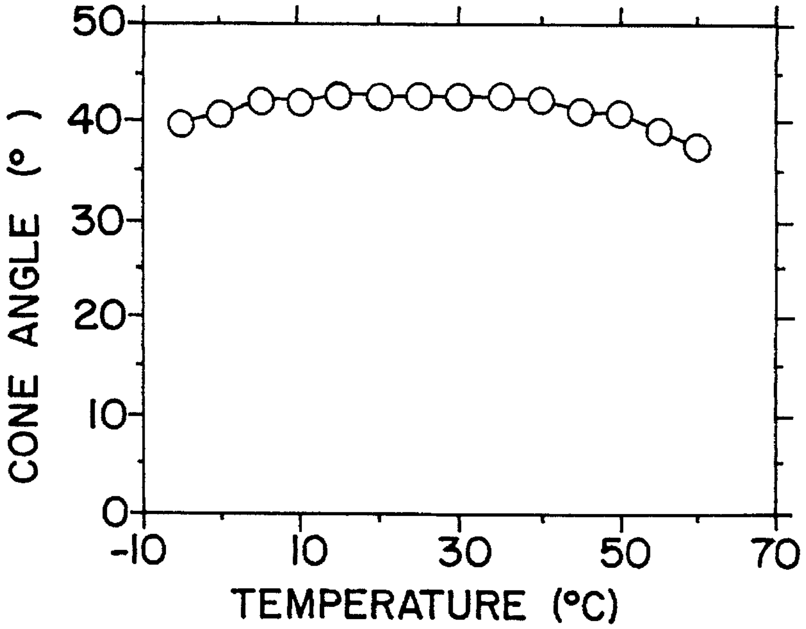
FIG. 18 is a graph illustrating the dependence of the cone angles of liquid crystals on temperature.

A voltage of 20 V was applied and the cone angle was measured. The result is shown in FIG. 18. The cone angle was a stable one of 43°±2° within a temperature range from 0° to 50° C. A rectangular wave from 20 to 0.1 V was applied. The resulting optical response was measured. When high voltages were applied, the transmittance of the liquid crystal cell changed quickly. When low voltages were applied, a period of one or more seconds passed until the transmittance became saturated. The transmittances were measured, and the results are shown in FIG. 13. At this time, the polarization axes of the polarizers were brought into conformity with the long axis of each liquid crystal molecule. Thus, quenching positions were derived. The quenching positions obtained when the polarization axes of the polarizers were adjusted to the first state are indicated by the curve 150 (indicated by circles). The quenching positions obtained when the polarization axes of the polarizers were adjusted to the second state are indicated by the curve 151 (indicated by squares).

When the polarization axes of the polarizers were adjusted to the first state, a stable dark state was obtained from a high voltage to a low voltage, and uniform orientation 199 was produced. The contrast ratio was about 100.

However, when the polarization axes of the polarizers were adjusted to the second state, the dark state became darker at voltages less than about 5 V. This means that the state-maintaining voltage is 5 V. A large voltage of 15 V was required so that the contrast ratio produced when the polarizer was adjusted to the first state could be coincident with the contrast ratio produced when the polarizer was adjusted to the second state. This means that when molecules are oriented in this direction, the state thereof is not stable.

Figure 1:
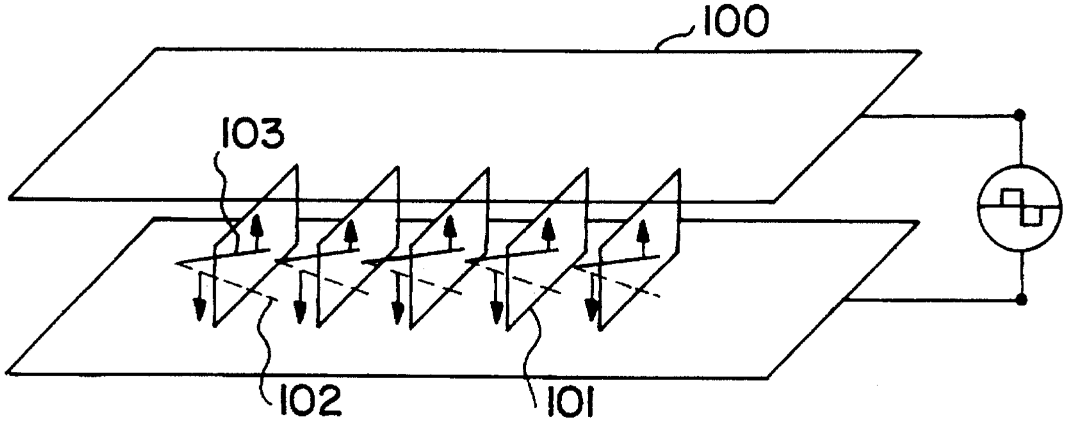
FIG. 1 PRIOR ART
FIG. 1 is a conceptual diagram of a ferroelectric liquid crystal.
Figure 3:
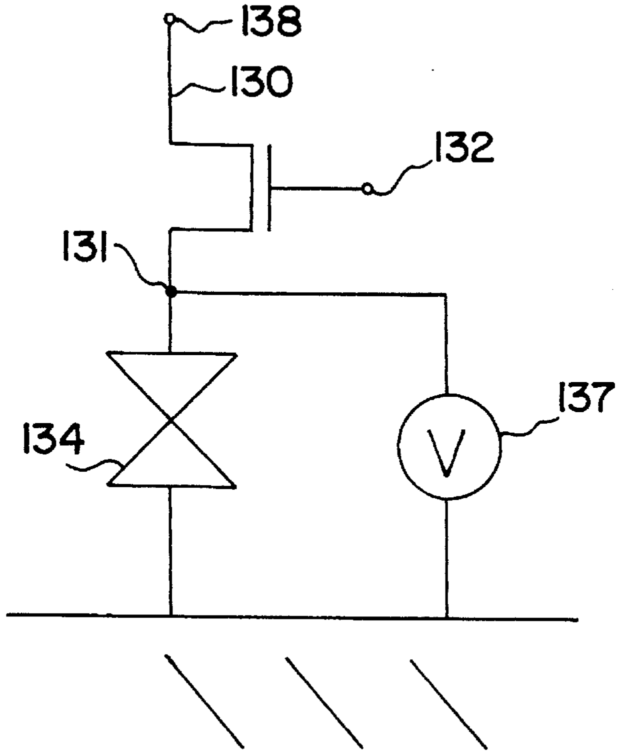
FIG. 3 PRIOR ART
FIG. 3 is a diagram of a circuit for measuring a voltage-maintaining factor.
Figure 2:
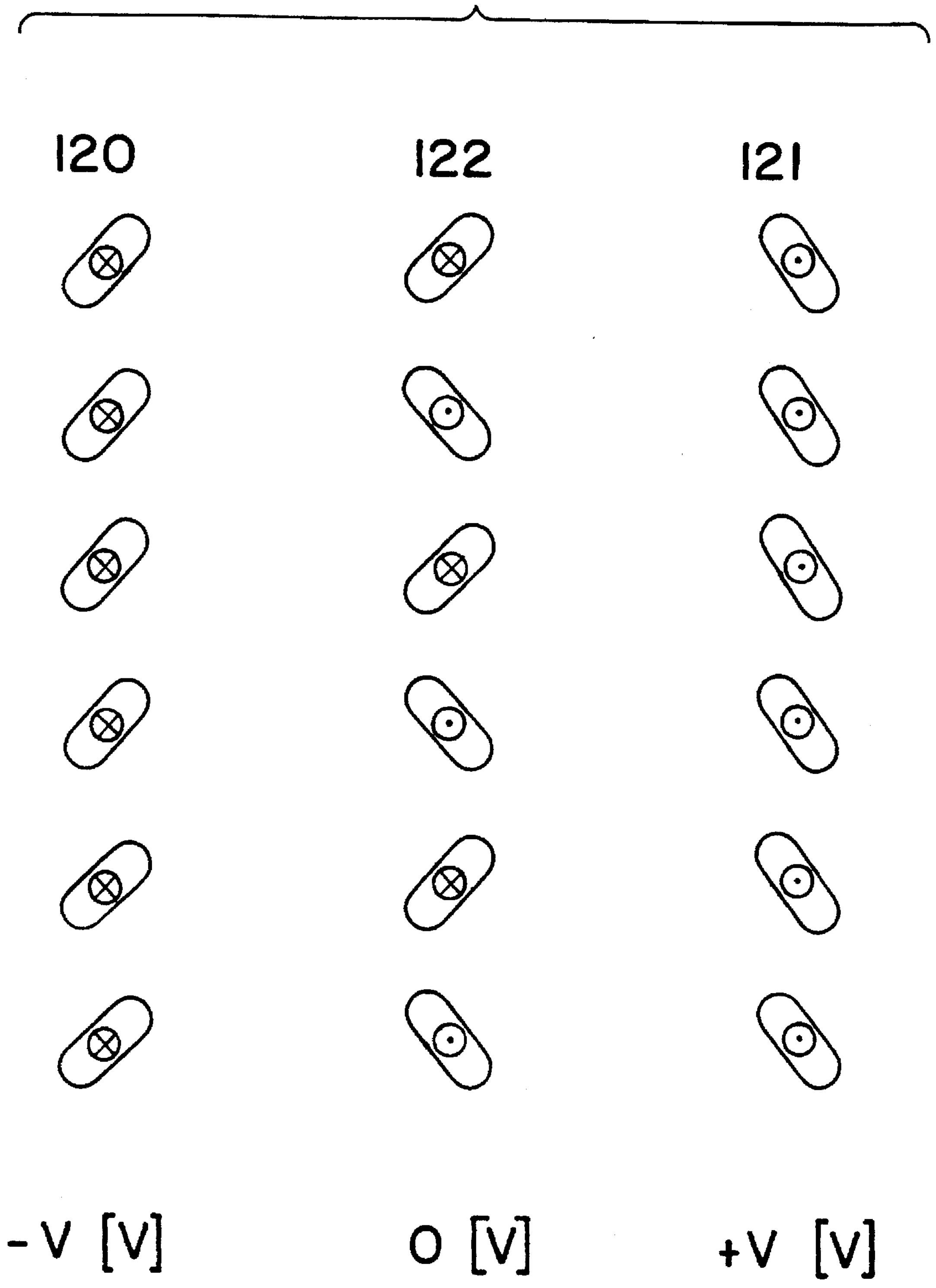
FIG. 2 PRIOR ART
FIG. 2 is a conceptual diagram of an antiferroelectric liquid crystal.
Figure 4A:
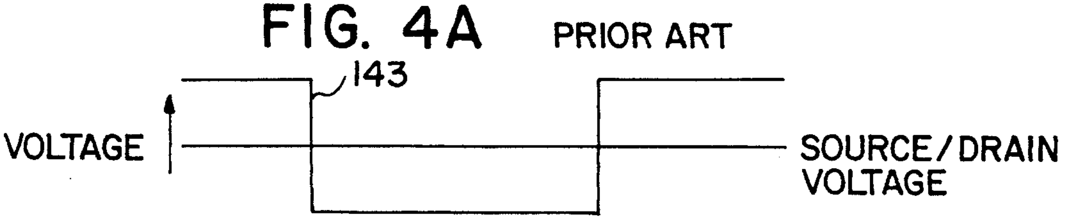
FIG. 4A PRIOR ART
FIG. 4 is a waveform chart illustrating measurement of nematic liquid crystals.
Figure 4B:
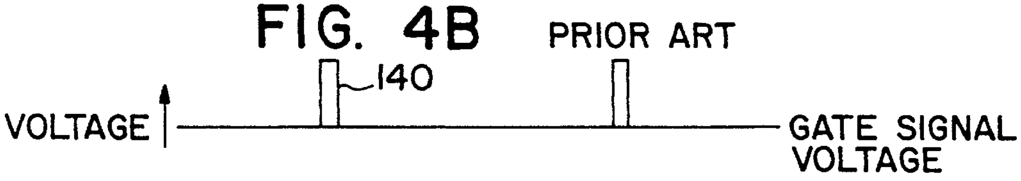
FIG. 4B PRIOR ART
Figure 4C:
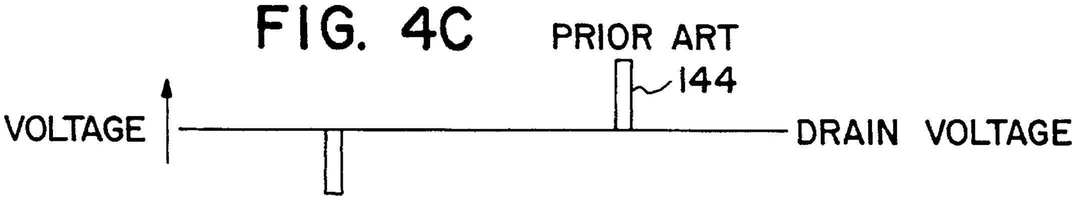
FIG. 4C PRIOR ART
Figure 4D:
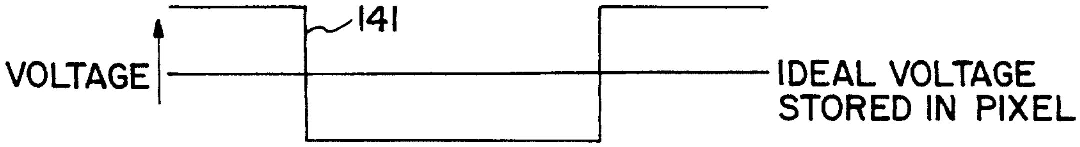
FIG. 4D PRIOR ART
Figure 4E:
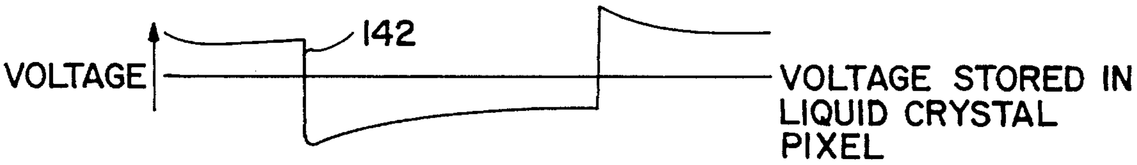
FIG. 4E PRIOR ART
Figure 5A:
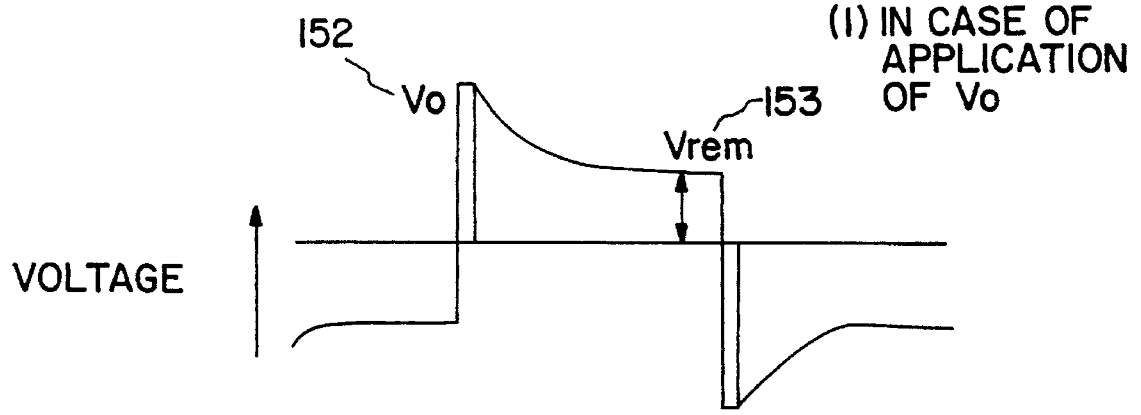
FIG. 5 is a waveform chart illustrating the manner in which a ferroelectric liquid crystal is driven by TFTs.
Figure 5B:
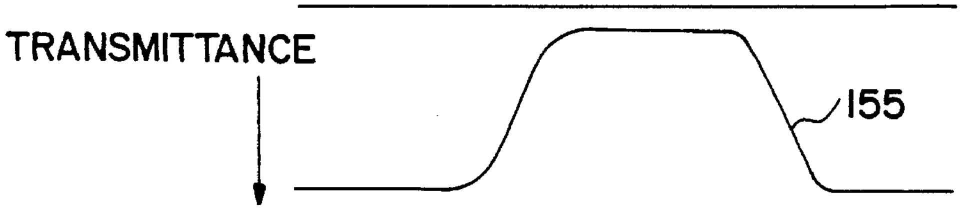
Figure 5C:
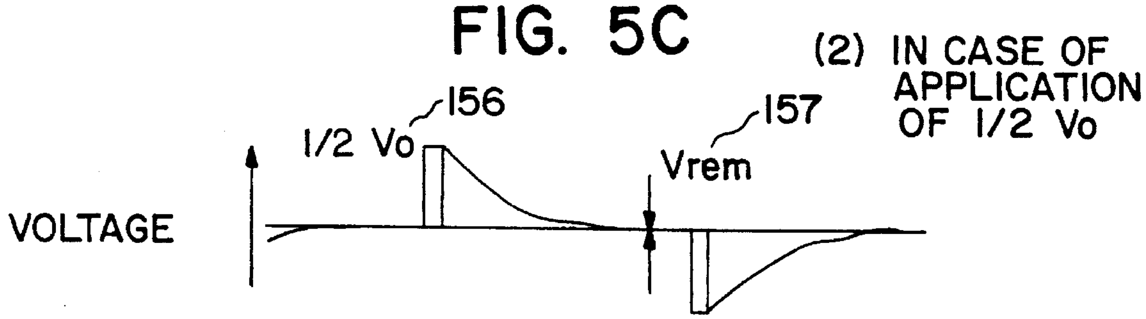
Figure 5D:
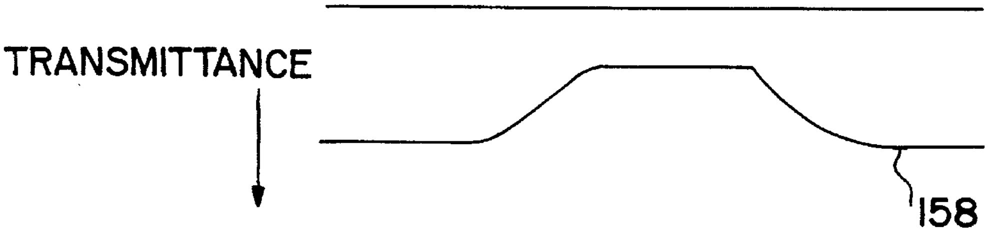

In this way, a good panel having a high contrast ratio can be fabricated by arranging the polarizers 202 and 297 shown in FIG. 2 in such a way that their polarization axes are adjusted to the first state.

EXAMPLE 2

Figure 9:
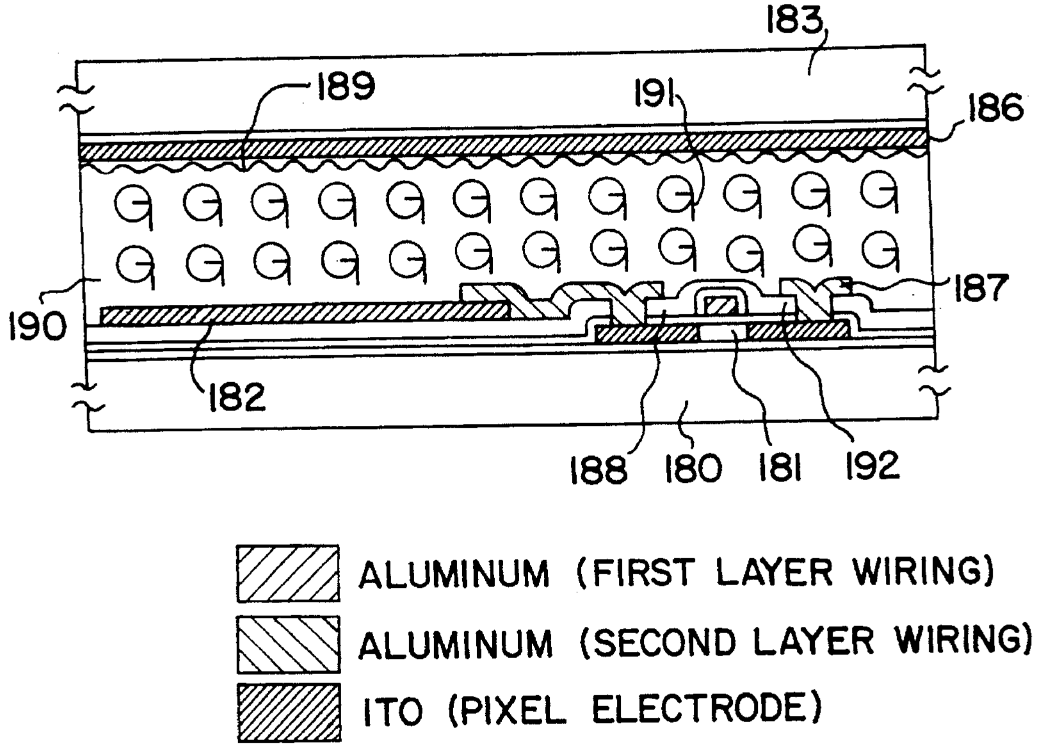
FIG. 9 is a schematic cross-sectional view of a liquid crystal electro-optical device according to the present invention.

The liquid crystal material having the characteristics described in Example 1 was injected into the cell of a liquid crystal display having TFTs. Referring to FIG. 9, self-aligning n-channel polysilicon TFTs 181 were fabricated on a substrate 180 of Corning 7059 by a normal low-temperature process. Lead electrodes 187 were connected with the source 192. Pixel electrodes 182 made of ITO were connected with the drain 188. A counter substrate 183 was also made of Corning 7059. A pixel common electrode 186 was formed also from ITO on this substrate. Polyimide 189 was applied by spin coating and baked at 280° C. LQ1500 manufactured by Hitachi Chemical Co. Ltd., Japan, or LP-64 manufactured by Toray Industries, Japan, was used as the polyimide. The thickness was 100 to 300 Å. This substrate was rubbed in one direction. When the substrate having the TFTs thereon was rubbed, sufficient care was exercised to prevent the devices from being destroyed by static electricity. This was carried out by grounding the lead electrodes.

Then, Shinshikyu made of silica in the form of particles having diameters of 1.5 μm manufactured by Catalytic Chemical Co, Ltd., Japan, was dispersed as a spacer on the substrate having the TFTs thereon. A sealing agent (epoxy resin in this case) was applied to the substrate having the counter electrode by screen printing. Both substrates were bonded together with a gap of 1.5 μm therebetween in conformity with the diameters of the spacer particles. A ferroelectric liquid crystal 190 made of phenyl pyrimidine was injected into the cell. The phase sequence was isotropic phase—smectic A phase—smectic C* phase—crystalline phase. The temperature at which a transition to the isotropic phase was made was approximately 80° C. The liquid crystal material was heated to 100° C. When the liquid crystal material became isotropic, it was injected in a vacuum.

Figure 10:
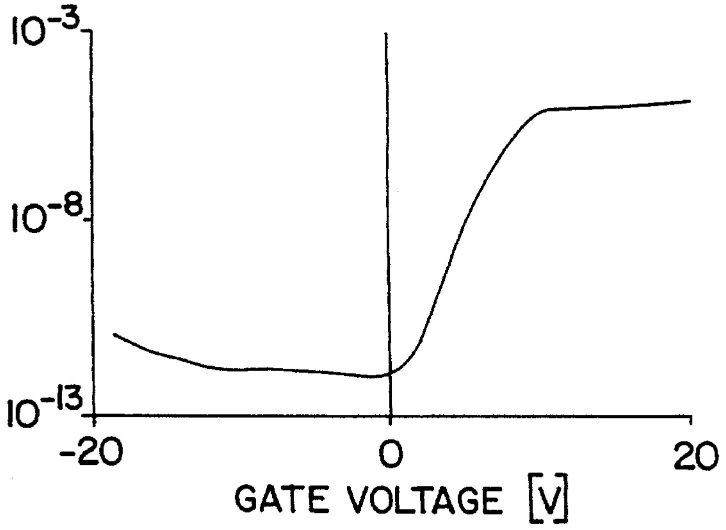
FIG. 10 is a graph showing the characteristics of TFTs used in the present invention.

The gate-drain characteristic of a typical TFT is shown in FIG. 10. The ON/OFF ratio was represented by about 7 figures.

When no voltage was applied, splay orientation was observed. The TFTs applied a voltage exceeding the state-maintaining voltage. As a result, the spontaneous polarizations of the molecules were oriented uniformly between the substrates. That is, the liquid crystal material changed from splay orientation to uniform orientation. The state of the liquid crystal, i.e., ON or OFF, was completely controlled by the electric field produced across the pixel electrodes. The contrast ratio was about 100.

COMPARATIVE EXAMPLE 1

The same liquid crystal material as used in Example 1 was employed. Orientation films were formed on both substrates rather than on one substrate. The obtained characteristics were examined. As can be seen from FIG. 14, since the orientation means are arranged symmetrically, coincident characteristics were obtained when the quenching position was adjusted to either state.

The state-maintaining voltage was about 3 V. At voltages less than this value, increases in the dark state were observed. Even if high voltages were applied, good transmittances were not obtained in the dark state. The contrast ratio was 20 to 40. In light of this, it cannot be said that satisfactory characteristics were derived.

EXAMPLE 3

Figure 17:
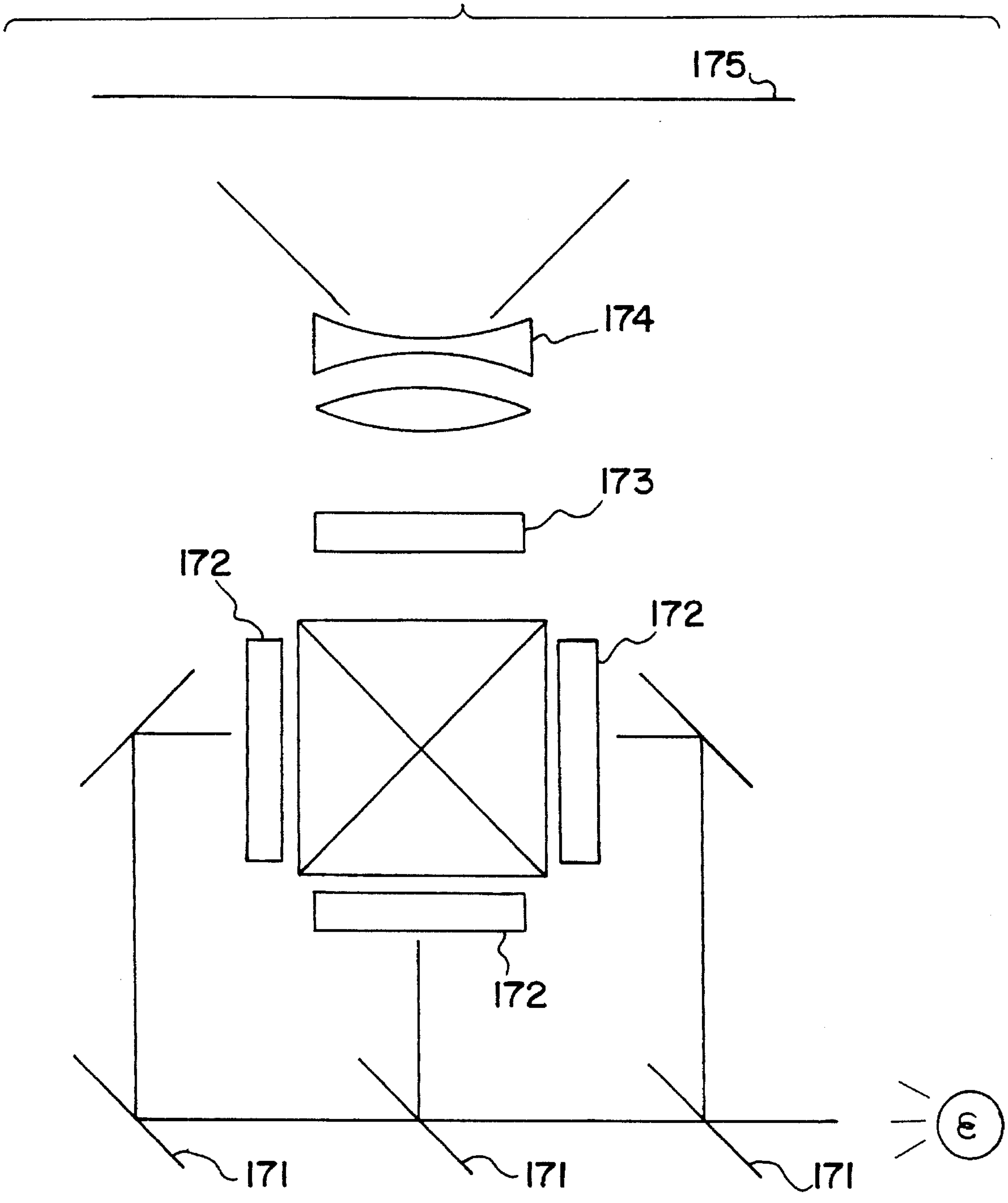
FIG. 17 is a diagram showing an application example of a liquid crystal projection display utilizing the present invention.

Three panels of the simple shutter used in Example 1 and one TFT cell used in Example 2 were employed to fabricate a liquid crystal projector display. This is described by referring to FIG. 17. Incident light was divided into red, green, and blue colors by a dichroic mirror 171. Each color was made to enter a corresponding one of simple shutters 172. The light emerging from this shutter was introduced into a TFT cell 173 and projected onto a wall surface 175 by a lens system 174.

At this time, each simple shutter 172 passes only one (e.g. red light) of the three colors of light to the TFT cell. At this time, a red image signal is formed on the TFT cell. The selected simple shutter and TFT are successively changed according to a red image, green image, and blue image, in that order. The time for the image of each color to be formed is 5 msec. In this way, a color image is projected at a frequency of 60 Hz. A negative voltage of −10 V was applied for 5 msec to turn on each simple shutter. A positive voltage of 10 V was applied for 10 msec to turn off each simple shutter. The response speed of the liquid crystal was 100 μsec. The liquid crystal changed optically according to the response waveform. In step with each color of light projected, the image on the TFT panel is switched. At this operating frequency, the observer sees no flicker, and a stable TV image can be displayed.

EXAMPLE 4

Figure 6:
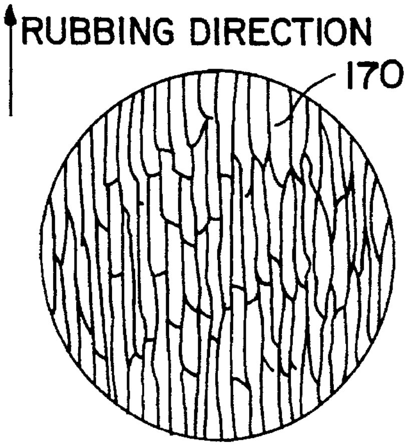
FIG. 6 is a view illustrating multi-microdomain orientation.
Figure 7:
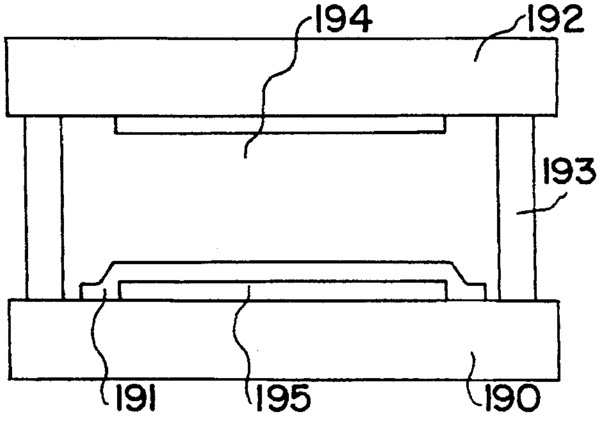
FIG. 7 is a side elevation of a ferroelectric liquid crystal cell, showing the manner in which the threshold value of the liquid crystal is measured.

The state-maintaining voltage $V_{SM}$ of a liquid crystal cell having spontaneous polarization was evaluated. The results are illustrated in FIG. 7. Indium tin oxide (ITO) was sputtered or deposited as a film 195 having a thickness of 500 to 2000 Å on a soda-lime glass 190 and was patterned by conventional photolithography. Two sheets of such substrates were prepared. Polyimide 191 was applied to one substrate 190 by spin coating and baked at 280° C. LQ5200 manufactured by Hitachi Chemical Co. Ltd. , Japan, or LP-64 manufactured by Toray Industries, Japan, was used as the polyimide. The thickness of the polyimide film was 100 to 300 Å. This substrate was rubbed in one direction. This was placed opposite the non-oriented glass substrate 192. Shinshikyu made of silica in the form of particles having diameters of 1.5 μm manufactured by Catalytic Chemical Co. Ltd., Japan, was dispersed as a spacer (not shown) on the orientation film side substrate. A sealing layer 193 made from epoxy resin was formed by screen printing on the substrate having the counter electrode. Both substrates were bonded together while maintaining the spacing between them at about 1.5 μm according to the diameters of the spacer particles. A ferroelectric liquid crystal 194 of a phenyl pyrimidine was injected into the cell. The phase sequence was isotropic phase-smectic A phase-smectic C* phase-crystalline phase, the magnitude of the spontaneous polarization was 6 $nC/cm^2$, the dielectric constant was 4.4, the response speed obtained when a voltage of 14 V was applied to the cell was 100 μsec, and the temperature at which a transition to the isotropic phase was made was about 90° C. The liquid crystal material was heated to 110° C., and the liquid crystal was injected under a vacuum when it became isotropic. Multi-microdomain orientation was observed as shown in FIG. 6.

Figure 8:
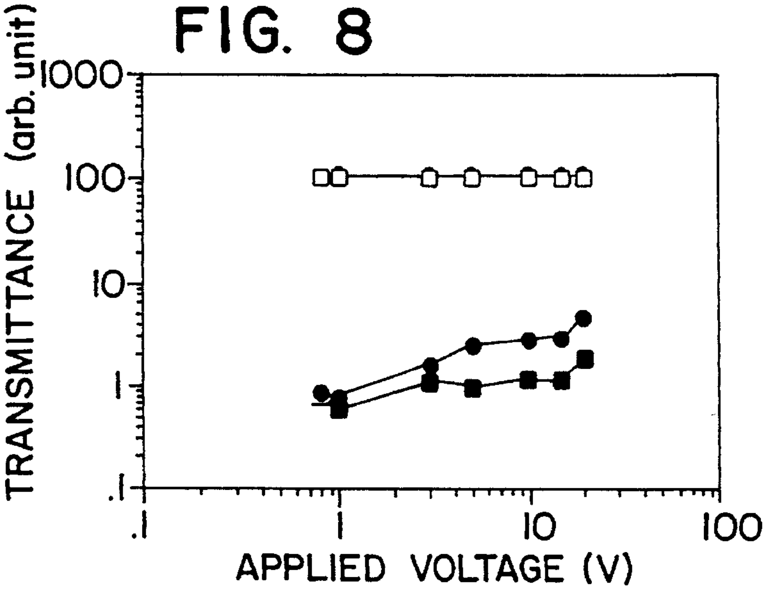
FIG. 8 is a graph showing measured threshold voltages of ferroelectric liquid crystals used in the present invention.

A rectangular wave was applied between 20 to 0.1 V. The resulting optical response was measured. When high voltages were applied, the transmittance of the liquid crystal cell changed quickly. When low voltages were applied, a period of one or more seconds passed until transmittance became saturated. These transmittances were measured. At this time, the polarization axes of the polarizers were brought into conformity with the long axis of each liquid crystal molecule, whereby a quenching position was assumed. With respect to this quenching position, measurements were made for cases in which the polarizers were adjusted to both the first and second states. The results are shown in FIG. 8. In either quenching position, clear gray levels can be obtained from 20 to 0.8 V. No change in state occurred at voltages lower than that range. It can be said that the threshold voltage at which the liquid crystal switches to another state is 0.8 V.

Characteristics obtained when the above-described liquid crystal material was injected into the cell having TFTs are described now by referring to FIG. 9. Selfaligning n-channel polysilicon TFTs 181 were fabricated on the substrate 180 of Corning 7059 by a normal low-temperature process, lead electrodes 187 were connected with the source 192, and pixel electrodes 182 made of ITO were connected with the drain 188. A counter substrate 183 was also made of Corning 7059. A pixel common electrode 186 was formed also from ITO on this substrate and polyimide 189 was applied by spin coating then baked at 280° C. LQ1500 manufactured by Hitachi Chemical Co. Ltd., Japan, or LP-64 manufactured by Toray Industries, Japan, was used as the polyimide, the thickness of which was 100 to 300 Å. This substrate was rubbed in one direction. When the substrate having the TFTs thereon was rubbed, sufficient care was exercised to prevent the devices from being destroyed by static electricity. This was carried out by grounding the lead electrodes.

Shinshikyu made of silica in the form of particles having diameters of 1.5 μm manufactured by Catalytic Chemical Co, Ltd., Japan, was dispersed as a spacer (not shown) on the substrate on the side of the TFTs. A sealing layer made from epoxy resin was formed by screen printing on the substrate having the counter electrode. Both substrates were bonded together while maintaining the spacing between them at about 1.5 μm according to the diameters of the spacer particles. A ferroelectric liquid crystal 190 of a phenyl pyrimidine was injected into the cell. The phase sequence was isotropic phase-smectic A phase-smectic C* phase-crystalline phase, and the temperature at which a transition to the isotropic phase was made was about 80° C. The liquid crystal material was heated to 100° C., and the liquid crystal was injected under a vacuum when it became isotropic. The spontaneous polarizations of the molecules are shown to be oriented in a given direction 191 and thus a uniform orientation is obtained. After sealing the device, a driver circuit was connected, and the device was inspected.

Figure 11A:
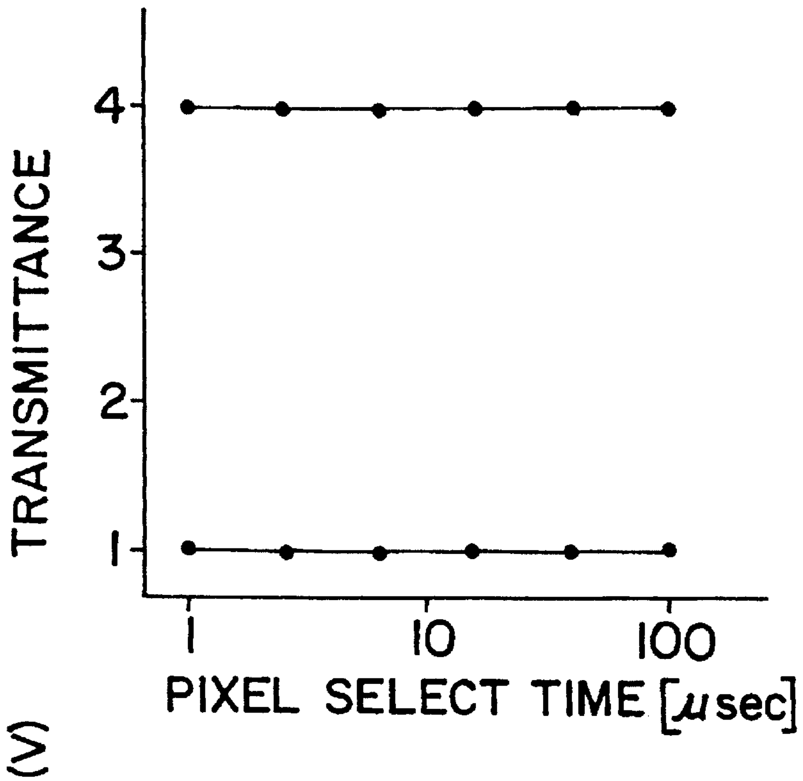
FIG. 11 shows the effects of the liquid crystal electro-optical device shown in FIG. 9.
Figure 11B:
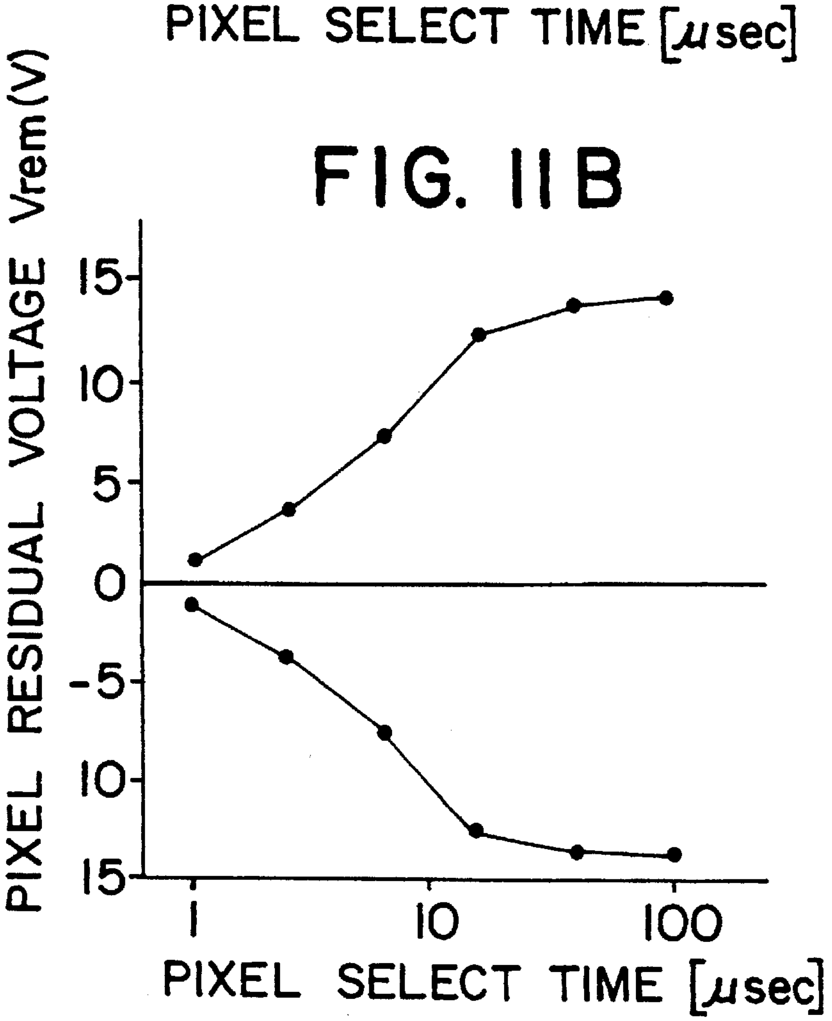

The gate-drain characteristic of a typical TFT is shown in FIG. 10. The ON/OFF ratio was represented by about 7 figures. The voltage applied to the pixel was maintained at 14 V. The period for which the voltage was applied was varied from 100 to 1 μsec while keeping the gate on and the direction of the electric field was changed every 5 msec. The state of the liquid crystal was switched by the direction of the electric field. As shown in FIG. 11, the positions at which the transmittance jumped were substantially constant even if the pixel select time (in practice, the time for which a signal is applied to the gate) was reduced from 100 μsec to 1 μsec. The pixel residual voltage decreased according to the decrease in the pixel select time. $V_{rem}$ was 1.5 V when the select time was 1 μsec. This is sufficiently larger than the threshold value of 0.8 V of the liquid crystal and hence the liquid crystal can respond sufficiently optically.

EXAMPLE 5

Figure 12:
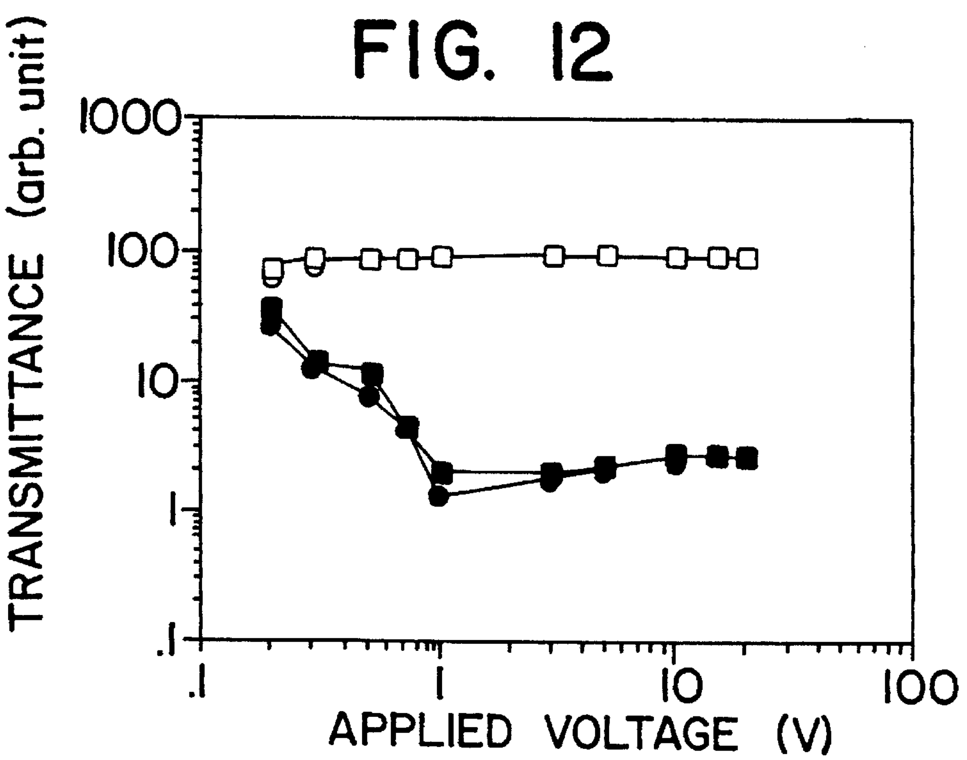
FIG. 12 is a graph showing measured threshold voltages of ferroelectric liquid crystals used in the invention.

Orientation films were formed from the same material as used in Example 4 on the opposite sides of two substrates, and their characteristics were examined. The threshold value characteristics are shown in FIG. 12. The transmittance was attenuated at lower voltages. The state-maintaining voltage $V_{SM}$ was 0.8 V. Where the device was driven with TFTs, the device responded sufficiently with a residual voltage of 1.5 V although the select period was 1 μsec.

COMPARATIVE EXAMPLE 2

A cell having the same structure as the cell of Example 4 was used. That is, the substrate on one side of the cell had no orientation film. A liquid crystal material ZLI3654 manufactured by Merck Corporation was used, and measurements were taken. This cell exhibits twisted orientation. As shown in FIG. 13, the state-maintaining voltage $V_{SM}$ was 8 V on only one side and stable on the other side. Although the orientation was twisted type, the device had monostable electric characteristics. When this liquid crystal was driven with TFTs, if the select period was shorter than 20 μsec, the liquid crystal potential $V_{rem}$ was lower than 5 V and the device failed to respond sufficiently optically.

COMPARATIVE EXAMPLE 3

Figure 14:
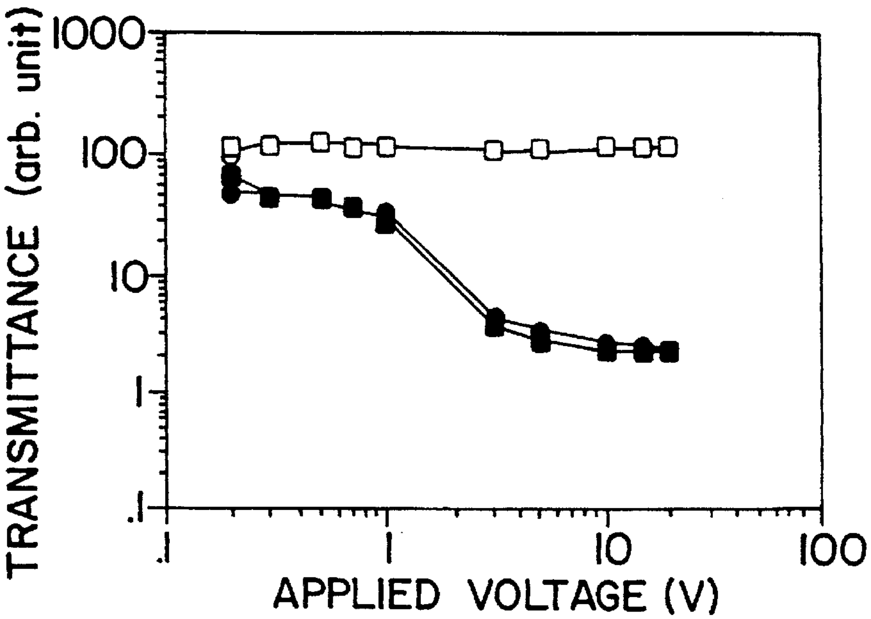
FIG. 14 is a graph showing comparative examples of measured threshold voltages of ferroelectric liquid crystals.

Measurements were made under the condition that orientation films were formed on both sides of glass substrates. As shown in FIG. 14, the state-maintaining voltage $V_{SM}$ was 5 V on both sides. As the voltage decreased on both sides, the transmissive state was observed in a gradually narrowing range. In this state, the cell showed twisted orientation. When this liquid crystal was driven with TFTs, if the select period was shorter than 20 μsec, the liquid crystal potential voltage $V_{rem}$ was lower than 5 V and the device failed to respond sufficiently optically.

EXAMPLE 6

Figure 15:
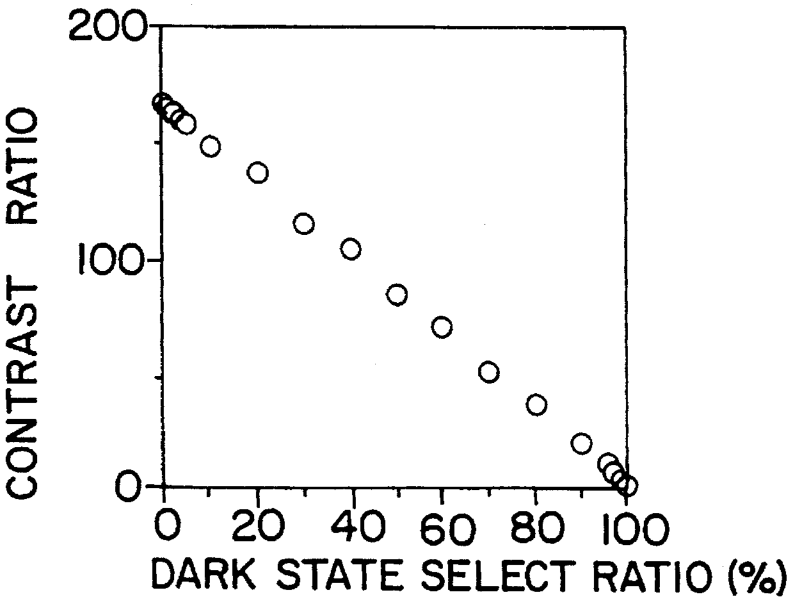
FIG. 15 is a graph in which contrast ratio is plotted against dark state select ratio, illustrating a digital gray scale.

An antiferroelectric liquid crystal was injected into the cell used in Example 4, and the state-maintaining voltage $V_{SM}$ was measured. This voltage $V_{SM}$ was 8 V. The liquid crystal cell was driven with TFTs and measurements were made. When the applied voltage was 15 V, if the gate select time was 20 μsec, the residual voltage $V_{rem}$ was 10 V, and the device responded sufficiently. The contrast ratio was 170. This cell was driven while varying the periods of the ON state (bright state) and the OFF state (dark state). In this way, a digital gray scale was examined. As shown in FIG. 15, 100 gray levels were accomplished.

In EXAMPLE 6, the digital gray scale was realized with 100 gray levels by controlling the periods of the ON state and the OFF state. A gray scale with more gray levels can be realized by controlling both the magnitude of the pixel electrode voltage and the duration of the pixel electrode voltage. That is, both the sufficient optical response such as the optical change 155 in FIG.5 and the insufficient optical response such as the optical response 158 in FIG. 5 are utilized for the control of the magnitude of the pixel electrode voltage.

In the present invention, a liquid crystal material having spontaneous polarization is activated while a voltage was applied at all times. Unlike the conventional method using application of an AC waveform and the ability to retain information, the novel device can display images stably over a wide range of temperatures. The invention can find wide application including simple shutters and devices driven with TFTs. The invention is applicable to liquid crystal TV receivers and projection displays.

Where a liquid crystal having spontaneous polarization is driven by a cell having TFTs, the use of liquid crystal materials having small threshold voltages of 0.1 to 4 V at which the materials are switched from their first state to their second state, exhibiting uniform orientation, and showing multi-microdomain orientation is quite advantageous.

Where such a liquid crystal is used, when it is driven with TFTs, inversion can be effected very efficiently. The liquid crystal can be driven sufficiently even if the time (e.g., 1 μsec) for which an electric charge is injected into the pixel, i.e. the time for which the gate is ON, is much shorter than the response speed of the liquid crystal. In this way, an image can be displayed well even at a high operating frequency as encountered when a digital gray scale is employed. Hence, a high-performance liquid crystal display making positive use of various feature of the ferroelectric liquid crystal, i.e., fast response, high contrast ratio, and wide viewing angle, can be achieved. This is useful for fabrication of a liquid crystal TV driven by a video signal.

What is claimed is:

1. A method of driving an electro-optical device comprising:

a pair of substrates;

a pixel electrode provided on one of said substrates;

a liquid crystal material having spontaneous polarization and sandwiched between said substrates;

orienting means provided on a surface of at least one of said substrates which is in contact with said liquid crystal material, said orienting means acting to orient molecules of said liquid crystal material along one axis in at least an initial stage; and a thin-film transistor connected with said pixel electrode at one of source and drain thereof, said method comprising:

applying a voltage in different polarities from said thin-film transistor to said liquid crystal material to switch the liquid crystal material between a first state and a second state, wherein a voltage exceeding a voltage required to maintain said liquid crystal material in one of said first and second states is applied to said pixel electrode during each select period in which the electro-optical device is displaying an image; and wherein the application of said voltage exceeding the voltage required to maintain said liquid crystal material in one of said first and second states is carried out by applying a voltage pulse to a gate of said thin-film transistor at a pulse width of 0.1 μsec. to 1.5 $T_O$ with a frame period of between 1/6000 sec. and 1/66000 sec., and applying a voltage of 10 V to 25 V to the other one of said source and drain during the application of said voltage pulse, where $T_O$ is a response time of said liquid crystal material.

2. The method of claim 1 wherein said voltage required to maintain said liquid crystal material in one of said first and second states is a voltage of said pixel electrode required to uniformly orient said liquid crystal material in said one of said first and second states after inversion of said spontaneous polarization during said each select period.

3. The method of claim 1 wherein said liquid crystal material comprises a liquid crystal selected from the group consisting of a ferroelectric liquid crystal and an antiferroelectric liquid crystal.

4. The method of claim 1 wherein said electro-optical device further comprises a lead electrode connected with said thin-film transistor.

5. The method of claim 1 wherein said thin film transistor is a polysilicon thin film transistor.

* * * * *